United States Patent
Lee et al.

(10) Patent No.: US 10,987,656 B2
(45) Date of Patent: Apr. 27, 2021

(54) CORE-SHELL NANOPARTICLE, METHOD FOR MANUFACTURING SAME AND METHOD FOR PRODUCING HYDROGEN PEROXIDE USING SAME

(71) Applicant: Korea University Research and Business Foundation, Seoul (KR)

(72) Inventors: Kwan-Young Lee, Seoul (KR); Myung-gi Seo, Seoul (KR); Seongmin Kim, Daejeon (KR); Ha Eun Jeong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 7 days.

(21) Appl. No.: 15/508,227

(22) PCT Filed: Jan. 7, 2015

(86) PCT No.: PCT/KR2015/000150
§ 371 (c)(1),
(2) Date: Mar. 2, 2017

(87) PCT Pub. No.: WO2016/035945
PCT Pub. Date: Mar. 10, 2016

(65) Prior Publication Data
US 2017/0282160 A1    Oct. 5, 2017

(30) Foreign Application Priority Data

Sep. 4, 2014  (KR) .................. 10-2014-0117371

(51) Int. Cl.
*B01J 23/44*    (2006.01)
*B01J 35/00*    (2006.01)
(Continued)

(52) U.S. Cl.
CPC .............. *B01J 23/44* (2013.01); *B01J 13/14* (2013.01); *B01J 21/12* (2013.01); *B01J 23/38* (2013.01);
(Continued)

(58) Field of Classification Search
CPC ... B01J 21/12; B01J 23/36; B01J 23/38; B01J 23/40; B01J 23/42; B01J 23/44;
(Continued)

(56) References Cited

U.S. PATENT DOCUMENTS 5,110,572 A * 5/1992 Calabro ............. B01D 53/8628
423/705
8,044,292 B2 10/2011 Xiao et al.
(Continued)

FOREIGN PATENT DOCUMENTS

EP    0340868 A1 * 11/1989 ............... C07C 2/10
JP    2013-139506 A    7/2013
(Continued)

OTHER PUBLICATIONS

Hensen (Acidity Characterization of Amorphous Silica-Alumina, The Journal of Physical Chemistry C (2012), 116, pp. 21416-21429).*
(Continued)

*Primary Examiner* — Jun Li
(74) *Attorney, Agent, or Firm* — Mintz Levin Cohn Ferris Glovsky and Popeo, P.C.; Steven M. Jensen; Joohee Lee

(57) ABSTRACT

This invention relates to core-shell nanoparticles having acid sites, a method of manufacturing the same, and a method of directly producing hydrogen peroxide using the same.

4 Claims, 10 Drawing Sheets

(51) Int. Cl.
*B01J 37/02* (2006.01)
*B01J 37/08* (2006.01)
*B01J 21/12* (2006.01)
*C01B 15/029* (2006.01)
*B01J 35/02* (2006.01)
*B01J 23/38* (2006.01)
*B01J 13/14* (2006.01)
*B01J 37/00* (2006.01)

(52) U.S. Cl.
CPC ....... *B01J 35/0013* (2013.01); *B01J 35/0086* (2013.01); *B01J 35/02* (2013.01); *B01J 37/009* (2013.01); *B01J 37/0072* (2013.01); *B01J 37/02* (2013.01); *B01J 37/0221* (2013.01); *B01J 37/08* (2013.01); *C01B 15/029* (2013.01)

(58) Field of Classification Search
CPC ........ B01J 23/46; B01J 23/48; B01J 37/0072; B01J 37/009; B01J 37/0221; B01J 35/0086
See application file for complete search history.

(56) References Cited

U.S. PATENT DOCUMENTS

| | | | |
|---|---|---|---|
| 2003/0173252 A1* | 9/2003 | Vaarkamp | B01J 29/06 208/111.35 |
| 2009/0008258 A1* | 1/2009 | Rei | B01J 37/0217 205/177 |
| 2012/0088654 A1* | 4/2012 | Wang | B01J 27/1804 502/164 |
| 2013/0172599 A1* | 7/2013 | Suzuki | B01J 37/10 560/208 |
| 2013/0202509 A1* | 8/2013 | Schuetze | B01J 35/08 423/213.5 |
| 2014/0057781 A1 | 2/2014 | Stamm Masias et al. | |
| 2015/0238950 A1* | 8/2015 | Kim | B01J 21/04 428/403 |
| 2017/0165655 A1* | 6/2017 | Sinha | B01J 37/18 |

FOREIGN PATENT DOCUMENTS

| | | |
|---|---|---|
| KR | 10-1999-0027774 A | 4/1999 |
| KR | 10-2001-0076225 A | 8/2001 |
| KR | 10-2003-0009443 A | 1/2003 |
| KR | 10-2012-0016904 A | 2/2012 |
| WO | 2013/037697 A1 | 3/2013 |

OTHER PUBLICATIONS

Miller (Catalytic and Crystallization Behavior of a Mullite Precursor Aerogel Process Prepared from a Double Alkoxide : (Di-sec-Butoxyaluminoxy) triethoxysilane, Langmuir 1996, vol. (12), pp. 2878-2880).*

Wang, Z. et al., "Palladium-doped silica-alumina catalysts obtained from double-flame FSP for chemoselective hydrogenation of the model aromatic ketone acetophenone", Jrl of Catalysis (2013), 302, pp. 10-19.

International Search Report for International Application No. PCT/KR2015/000150, dated May 21, 2015, 4 pages.

* cited by examiner

CORE-SHELL NANOPARTICLE, METHOD FOR MANUFACTURING SAME AND METHOD FOR PRODUCING HYDROGEN PEROXIDE USING SAME

CROSS-REFERENCES TO RELATED APPLICATIONS

This application is a U.S. national phase application, pursuant to 35 U.S.C. § 371, of PCT/KR2015/000150, filed Jan. 7, 2015, designating the United States, which claims priority to Korean Application No. 10-2014-0116925, filed Sep. 3, 2014, and Korean Application No. 10-2014-0117371, filed Sep. 4, 2014. The entire contents of the aforementioned patent applications are incorporated herein by this reference.

TECHNICAL FIELD

The present invention relates to core-shell nanoparticles, a method of manufacturing the same, and a method of producing hydrogen peroxide using the same, and more particularly to core-shell nanoparticles having acid sites, a method of manufacturing the same, and a method of producing hydrogen peroxide using the same.

BACKGROUND ART

A nanomaterial exhibits properties different from its inherent properties with a decrease in the size thereof, and thus is utilized in various fields including optical, electronic, medical and chemical fields, and is receiving attention in many industrial fields.

The application of the nanomaterial to catalytic fields using chemical properties thereof has a variety of advantages. When a nano catalyst, the size or shape of which is controlled, is decreased in its size, exposure of active sites thereof is increased and also the proportion of corners or edges having a large number of dangling bonds may increase, thus making it easy to participate in the reaction.

However, the use of metal nanoparticles is limited due to physicochemical properties of a metal nano catalyst. For example, when the reaction temperature is high, some nanoparticles are observed to lose the controlled shape and size. Many attempts have been made to solve problems in which thermal stability of the metal nanoparticles is decreased. In the case of a transition metal, study for ensuring thermal stability through sulfur treatment is reported. Also, in the case of some metals, various techniques are tried to ensure thermal stability because they are poisoned to sulfur and thus cannot undergo sulfur treatment. In particular, a core-shell structure in which an oxide is used for the shell is effective at maintaining thermal stability of the central meal.

A variety of materials are reported for oxide for the shell. Examples thereof may include $SiO_2$, $TiO_2$, $Al_2O_3$, $ZrO_2$ and $CeO_2$, and $SiO_2$ is particularly useful. Based on the properties of conventional shells, the number of materials having acid sites is very low. Typical acid sites are classified into Lewis acids and Bronsted acids, and alumina is known to have weak acid sites and to be composed mainly of Lewis acids. Depending on the kind of acid, reaction activity may vary in some catalytic reactions. Examples of the reactions may include isomerization and hydrocracking of n-alkane and hydrodeoxygenation (HDO) for removing oxygen by the addition of hydrogen, and such reactions are known to be carried out in the presence of a bicomponent catalyst having a Bronsted acid and a noble metal. For example, in n-alkane reaction and hydrocracking, a Bronsted acid is known to be an active site. Here, n-alkane does not contain a double bond or a triple bond and thus undergoes a decomposition reaction at a relatively high temperature. When a metal having the ability to remove hydrogen is added, an alkane is dehydrogenated into an alkene. The alkene thus converted has a double bond and thus is decomposed at a relatively low temperature. Such a decomposition reaction is known to be carried out at the Bronsted acid site. However, a shell having a considerable amount of Bronsted acids has not yet been reported.

Also, hydrogen peroxide is used as a bleaching agent for pulp and fiber, a disinfectant, a semiconductor cleaning liquid, an oxidizing agent in a water treatment process, or an environmentally friendly oxidizing agent for a chemical reaction (propylene oxide synthesis). Hydrogen peroxide was produced in an amount of 2.2 million tons in the year 2009, and the demand for hydrogen peroxide is expected to increase together with the increase in the demand for propylene oxide.

Currently, as disclosed in Korean Patent Application Publication Nos. 1999-0027774 and 2001-0076225, hydrogen peroxide is produced from an anthraquinone-based compound through continuous oxidation and hydrogenation processes. Here, a large amount of organic solvent is used and wasted. Furthermore, the production of hydrogen peroxide is problematic because multi-stage continuous processes are performed, followed by purification and concentration after production, thus incurring the consumption of large amounts of energy.

Hence, a direct production process for synthesizing hydrogen peroxide by directly reacting hydrogen with oxygen is receiving attention, and thorough research into such a direct production process is ongoing because water is produced as a reaction byproduct and the use of organic solvents is low, thus being promising as a replacement for commercial processes. Also, a direct production process is simple and thus enables the on-site production of hydrogen peroxide, thus significantly reducing the risk of explosion upon storage and transport of hydrogen peroxide.

Therefore, a catalyst and a reaction system for directly producing hydrogen peroxide are currently under study. However, a catalyst system for directly producing hydrogen peroxide mainly includes a metal catalyst, and the addition of an acid to a solvent is typical. The acid ($H^+$ ion) is reported to have various functions, among which functions of inhibiting the decomposition of synthesized hydrogen peroxide and increasing the selectivity of hydrogen peroxide are reported. However, the use of the acid may cause the dissolution of the active metal of the catalyst or the corrosion of the reactor. Furthermore, it is preferred that the acid be added in a small amount or not be added during the process of removing soil contaminants or bleaching cloth or texture using hydrogen peroxide. Hence, the acid, which is typically added to the solvent, is not used, or the amount thereof needs to be decreased.

Moreover, various catalysts using palladium to directly produce hydrogen peroxide from hydrogen and oxygen are being developed. When a catalyst carrier is used during the direct production of hydrogen peroxide, there are many reports of the acid properties of the carrier being changed, whereby the amount of acid used for the solvent is reduced. However, the use of a nano catalyst without a carrier has not yet been reported.

In particular, a palladium/silica-alumina catalyst having a core-shell structure, in which acid sites are utilized to thus decrease the amount of the acid added to the solvent so as to inhibit the dissolution of the catalyst and the corrosion of the reactor, has not yet been studied.

DISCLOSURE

Technical Problem

Among conventional core-shell nanoparticles using a metal as a core, the number of core-shell nanoparticles in which a shell has an acid site is very low. Even when the shell has an acid site, it has a weak acid site or is composed of only Lewis acid, and there are no reports of shells having both Lewis acids and Bronsted acids.

Thus, the present invention is intended to provide core-shell nanoparticles, wherein a silica-alumina composite is used as a shell, whereby the shell contains both a Bronsted acid site and a Lewis acid site.

Also, the present invention is intended to provide a method of manufacturing core-shell nanoparticles having acid sites.

Also, the present invention is intended to provide a method of directly producing hydrogen peroxide from hydrogen and oxygen using, as a catalyst, core-shell nanoparticles having a palladium core, among the above core-shell nanoparticles having acid sites.

Also, in the present invention, since the core-shell nanoparticles have acid sites, the amount of the acid used in the method of directly producing hydrogen peroxide is decreased, and the amount of produced hydrogen peroxide is increased.

Technical Solution

Therefore, the present invention provides a core-shell nanoparticle, comprising: a shell, including silica and alumina and having an acid site; and a core, including a metal nanoparticle surrounded by the shell.

In addition, the present invention provides a method of manufacturing the core-shell nanoparticle, comprising the steps of: (1) preparing a metal nanoparticle; (2) dispersing the prepared metal nanoparticle in a dispersion solvent, adding a base solution, and performing stirring; (3) adding the solution stirred in the step (2) with a silica precursor and an alumina precursor, thus forming a shell including silica and alumina on the surface of the metal nanoparticle; and (4) thermally treating the metal nanoparticle having the shell including silica and alumina formed on the surface thereof.

In addition, the present invention provides a method of directly producing hydrogen peroxide, comprising: directly producing hydrogen peroxide from hydrogen and oxygen using, as a catalyst, the core-shell nanoparticle having palladium as a core including a metal nanoparticle.

Advantageous Effects

According to the present invention, core-shell nanoparticles having acid sites can be used as a catalyst for various reactions that require a Bronsted acid, and can also be applied in a variety of fields other than catalytic fields.

Also, the core-shell nanoparticles can be utilized as a catalyst in a method of directly producing hydrogen peroxide from hydrogen and oxygen, thereby decreasing the amount of acid used upon the direct production of hydrogen peroxide and increasing the amount of hydrogen peroxide that is produced.

BEST MODE

Figure 1:
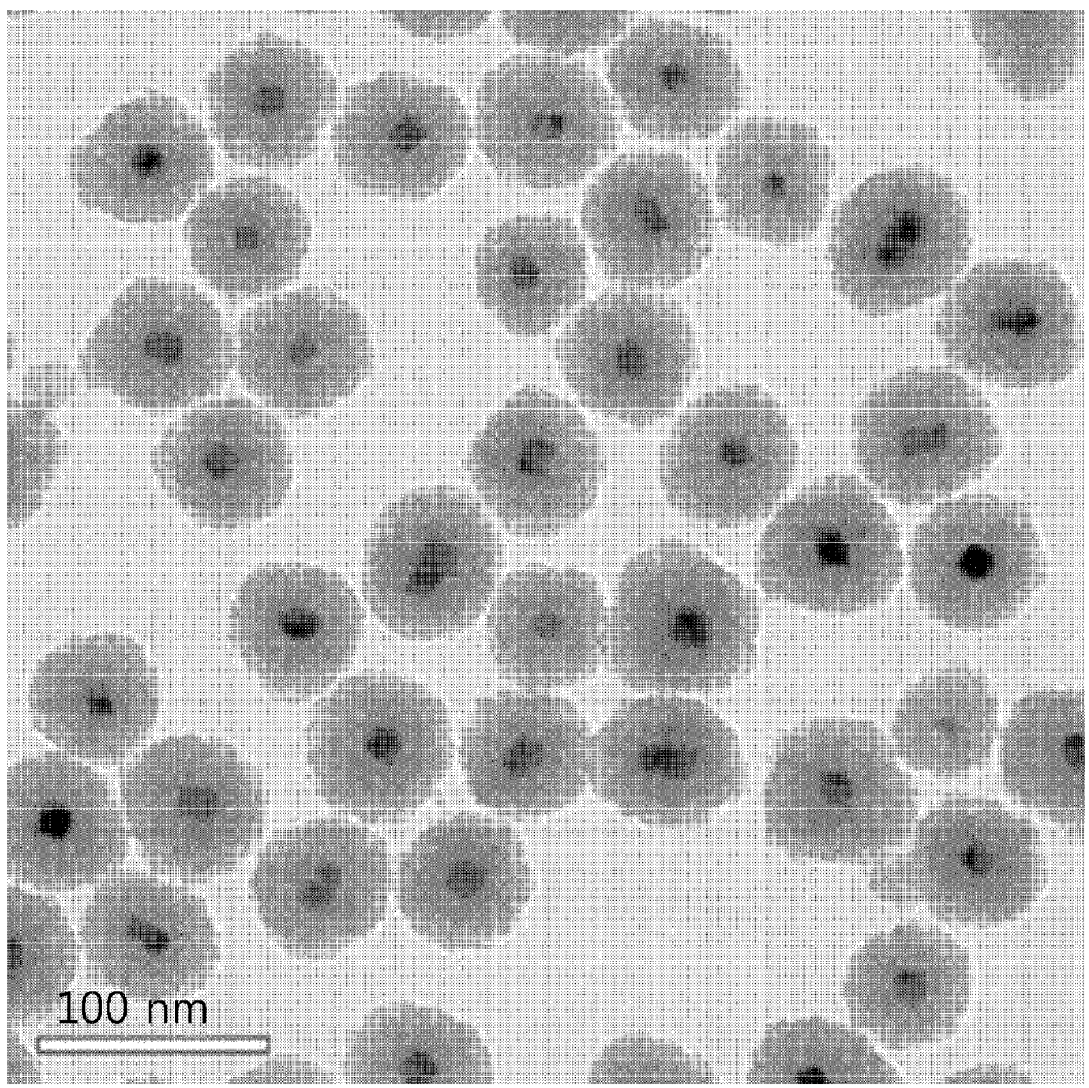
FIG. 1 is a TEM image showing core-shell nanoparticles (Pd@SA(20)) of Example 1.

Hereinafter, a detailed description will be given of the present invention.

In some catalytic reactions, reaction activity may vary depending on the kind of acid. Typical acid sites are classified into Lewis acids and Bronsted acids, and various reactions are known to be carried out at the Bronsted acid sites.

However, among nanoparticles having a core-shell structure, few shells having acid sites are found. Even when shells have acid sites, they have weak acid sites or are composed mainly of Lewis acids. In particular, a shell having a considerable amount of Bronsted acids has not yet been reported.

Thus, the present invention addresses core-shell nanoparticles having acid sites by forming a shell using a silica-alumina composite.

Specifically, the present invention addresses core-shell nanoparticles, each comprising a shell, including silica and alumina and having an acid site, and a core, including a metal nanoparticle surrounded by the shell.

The core-shell nanoparticles having acid sites, according to the present invention, are described below.

The core-shell nanoparticles are configured such that a core is surrounded by a shell; for example, a shell layer may be directly formed on the outer surface of a core, or an air layer may be formed between the core and the shell. The configuration, including the core, the shell around the outer surface of the core, and the air layer between the core and the shell, is referred to as a Yolk-shell.

The acid site includes at least one selected from the group consisting of a Lewis acid site and a Bronsted acid site.

The core includes a metal nanoparticle. The metal nanoparticle includes at least one selected from the group consisting of a noble metal, a transition metal, and an alloy thereof. More specifically, the noble metal may include at least one selected from the group consisting of palladium, platinum, gold, silver, rhodium and rhenium. The metal nanoparticle preferably includes palladium, which has high availability and is very effective for hydrogenation.

The size of metal nanoparticles may be controlled, and falls in the range of 1 to 30 nm, and preferably 5 to 30 nm. When metal nanoparticles having a particle size of 1 to 30 nm are used, the surface area of the metal exposed to the surface per unit volume may be controlled, and thus the introduction of the metal nanoparticles having a uniform size is able to maximize the specific surface area of the metal per unit volume. Also, the proportion of corners, edges or terraces of the metal may be adjusted depending on the size of the metal.

The metal nanoparticles are used in an amount of 0.1 to 30 wt % based on the total weight of the core-shell nanoparticles of the present invention. If the amount of the metal nanoparticles is less than 0.1 wt %, the shell may become thick, thus causing problems in terms of material transfer. On the other hand, if the amount thereof exceeds 30 wt %, the shell may become thin, and thus the number of acid sites may decrease, making it impossible to provide a sufficient number of acid sites to the core-shell nanoparticles.

In the core-shell nanoparticles of the present invention, the shell has an acid site, and thus, when the core-shell nanoparticles are used as a catalyst, they may play a role in supplying acid sites during catalysis.

The shell includes silica and alumina, and the number of acid sites may vary depending on the silica/alumina ratio.

Explaining the mechanism thereof, in the case where silicon and aluminum are mixed, aluminum and silicon have different atom sizes, and three structural defects are caused in silica-alumina, depending on the binding type thereof.

The first is aluminum cations substituted at the position of silicon cations in a tetrahedral coordination structure, the second is aluminum cations placed in a modified tetrahedral structure, and the third is silicon cations placed in a modified tetrahedral structure.

Among these, a defect caused by the aluminum cations having a tetrahedral coordination structure expresses Bronsted acidity, and the remaining two defects express Lewis acidity.

That is, when the molar amount of aluminum (Al) is increased and the silicon/aluminum (Si/Al) molar ratio is decreased, the number of acid sites may increase. Among methods of measuring acid sites, $NH_3$-TPD is a process of measuring the amount of ammonia desorbed after adsorption to the surface of a measuring material. This value may be greatly affected by the specific surface area of the measuring material.

Specifically, the two factors that affect the number of acid sites are the amount of aluminum (Al) and the specific surface area. When the amount of silicon (Si) is increased, the relative amount of aluminum (Al) is decreased, thus reducing the number of acid sites. On the other hand, when the molar amount of aluminum (Al) is increased, the number of acid sites may be raised.

Consequently, the kind of acid sites may vary depending on the binding type of silicon (Si) and aluminum (Al), and the number and/or intensity of acid sites may also vary. Thus, a typical representation that shows the acid sites in the silica-alumina may be the silicon (Si)/aluminum (Al) molar ratio.

In the present invention, the silicon/aluminum molar ratio is not particularly limited, but is preferably 10 to 500:1, and more preferably 10 to 200:1. If the molar amount of silicon is less than 10, the core-shell structure may not be formed. On the other hand, if the molar amount of silicon exceeds 500, the number of acid sites in the core-shell nanoparticles may decrease, which is undesirable.

Also, the thickness of the shell of the core-shell nanoparticles according to the present invention falls in the range of 10 to 1000 nm, and preferably 20 to 100 nm. If the thickness of the shell is less than 10 nm, the core-shell structure may not be stably maintained. On the other hand, if the thickness thereof exceeds 1000 nm, the shell may become thick, and thus material transfer to the central metal may become problematic.

Also, the core-shell nanoparticles of the invention are configured such that the shell contains pores, whereby the material transfer to the metal nanoparticles, corresponding to the central metal, through the pores is realized.

In the core-shell nanoparticles of the present invention, a metal having high availability is used as the core, and the shell is formed of a silica-alumina composite having both Bronsted acids and Lewis acids, and the thermal stability of the core-shell nanoparticles is increased.

In addition, the present invention addresses a method of manufacturing the core-shell nanoparticles, comprising the steps of: (1) preparing metal nanoparticles; (2) dispersing the prepared metal nanoparticles in a dispersion solvent, adding a base solution, and performing stirring; (3) adding a silica precursor and an alumina precursor to the stirred solution of step (2), thus forming a shell including silica and alumina on the surface of each of metal nanoparticles; and (4) thermally treating the metal nanoparticles having the shell including silica and alumina formed on the surface thereof.

Step (1) is a step of forming a core in core-shell nanoparticles, and the process of preparing the metal nanoparticles is not particularly limited so long as it is typically useful in the art. Preferably useful is a process of stabilizing the metal nanoparticles using a polymer material. Here, any polymer may be used so long as it is typically useful, and preferably includes at least one selected from the group consisting of cetyl trimethylammonium bromide, Pluronic P123, Lutensol AO5, and polyvinylpyrrolidone (PVP).

In order to stabilize the nanoparticles in the present invention, the polymer material PVP is used in the formation of the metal nanoparticles. This is deemed to be because the metal nanoparticles are not agglomerated but are well dispersed, and PVP surrounds the metal nanoparticles, making it possible to control the size of the metal nanoparticles.

Step (2) is a step of dispersing the metal nanoparticles, serving as the core, in order to form a uniform shell. As well, the sol-gel production rate of silica and alumina, which constitute the shell, is adjusted.

In this step, the metal nanoparticles prepared in step (1) are dispersed in the dispersion solvent. The dispersion solvent may include an organic solvent and/or water. The organic solvent may include at least one selected from the group consisting of methanol, ethanol, n-propanol, isopropanol, hexane, toluene, and benzene, and is preferably ethanol.

The amount of the dispersion solvent is not particularly limited so long as it is able to disperse the metal nanoparticles, and is preferably set to the range of 10 to 1000 mL. Given the above range, the metal nanoparticles may be uniformly dispersed, thus forming the shell.

During the preparation of the shell, the amount of a base solution, which is added after dispersion of the metal nanoparticles in the dispersion solvent, is regarded as very important in terms of controlling the shape of the shell. That is, the sol-gel production rate of silica and alumina contained in the shell has to be adjusted. This is because the sol-gel production rate functions to control the core-shell shape. Here, the sol-gel production rate may be adjusted by adding the base solution.

The base solution may include at least one selected from the group consisting of sodium hydroxide, potassium hydroxide and ammonia, and is preferably ammonia. The solvent for the base solution is not particularly limited so long as it is typically useful, and is preferably water.

The amount of the base solution that is added may be 1 to 20 vol %, and preferably 5 to 10 vol %, based on 100 vol % of the dispersion solvent. If the amount of the base solution is less than 1 vol %, the surface of the shell is not smooth, and the core and the shell may cling to each other, making it difficult to maintain the core-shell structure. On the other hand, if the amount thereof exceeds 20 vol %, silica-alumina spherical particles, in which metal is not incorporated in the shell, may be formed.

Step (3) is a step of forming core-shell nanoparticles, configured such that the surface and/or the periphery of the metal nanoparticles serving as the core are surrounded by the shell. The shell is a layer including silica and alumina, and may be as described above.

The silica precursor may include at least one selected from the group consisting of tetramethyl orthosilicate (TMOS), tetraethyl orthosilicate (TEOS), tetrapropyl orthosilicate (TPOS), and tetrabutyl orthosilicate (TBOS), and is preferably tetraethyl orthosilicate (TEOS).

The aluminum precursor may include at least one selected from the group consisting of aluminum ethoxide, aluminum isopropoxide, aluminum-tri-sec-butoxide, and di-sec-butoxyaluminoxy-triethoxysilane, and is preferably di-sec-butoxyaluminoxy-triethoxysilane.

The silica precursor and the alumina precursor may be mixed so that the silicon/aluminum molar ratio is 10 to 500:1, and preferably 10 to 200:1. If the molar amount of silicon is less than 10, the core-shell structure may not be formed. On the other hand, if the molar amount thereof exceeds 500, the number of acid sites in the core-shell nanoparticles may decrease.

Step (4) is a step of performing thermal treatment so that pores are formed in the core-shell nanoparticles, which are the metal nanoparticles having the layer including silica and alumina formed on the surface thereof in step (3). Here, the pores are a pathway for material transfer.

The core-shell nanoparticles prepared in step (3) are configured such that the metal nanoparticles are used as the core and the core is surrounded by the silica-alumina composite polymer material serving as the shell. In this state, however, material transfer to the metal nanoparticles, corresponding to the central metal, cannot be realized. Thus, the polymer material used upon the preparation of the metal nanoparticles is burned through thermal treatment, thus forming pores in the shell, whereby the pathway that enables the material transfer to the metal nanoparticles, corresponding to the central metal, may be ensured through the pores.

The temperature in step (4) may vary depending on the polymer material that is used upon the preparation of the metal nanoparticles, the silica precursor and the alumina precursor.

The thermal treatment temperature falls in the range of 400 to 900° C., and preferably 400 to 600° C. If the thermal treatment temperature is lower than 400° C., the polymer material is not removed, and thus pores may not be formed in the shell. On the other hand, if the thermal treatment temperature is higher than 900° C., the specific surface area may be decreased due to the high temperature.

Also, the thermal treatment time falls in the range of 3 to 18 hr, and preferably 6 to 18 hr. If the thermal treatment time is less than 3 hr, the polymer material bound to the metal nanoparticles is not removed, and thus pores may not be formed in the core. On the other hand, if the thermal treatment time is longer than 18 hr, economic benefits may be negated.

Hydrogen peroxide is produced from an anthraquinone-based compound through continuous oxidation and hydrogenation. As such, a large amount of organic solvent is used and wasted. Furthermore, the production of hydrogen peroxide is problematic because a lot of energy has to be consumed through multi-stage continuous processes, followed by purification and concentration after production.

Hence, a direct production process for synthesizing hydrogen peroxide by directly reacting hydrogen with oxygen is receiving attention, and such a direct production process is under active study as a replacement for commercial processes because it produces water as a reaction byproduct and the use of an organic solvent is low.

The core-shell nanoparticles of the present invention satisfy both the Lewis acid sites and the Bronsted acid sites, and have sufficient acid sites for the reaction, and may be used as a catalyst for the reaction, which was not conventionally applied.

Therefore, the present invention addresses a method of directly producing hydrogen peroxide, comprising directly producing hydrogen peroxide from hydrogen and oxygen using, as a catalyst, the core-shell nanoparticles having palladium as the metal nanoparticles, corresponding to the core, among the core-shell nanoparticles according to the present invention.

The nanoparticle catalyst having a core-shell structure, which is used in the method of directly producing hydrogen peroxide according to the present invention, has a particle size of 10 to 500 nm, and is configured such that palladium nanoparticles having a size of 1 to 30 nm are incorporated as the core in the silica-alumina shell, and may be used in an amount of 0.1 to 30 wt % based on the total weight of the core-shell nanoparticles. When the amount of the palladium nanoparticles falls in the above range, the core-shell nanoparticles preferably function as a catalyst during the direct production of hydrogen peroxide.

The shell of the catalyst is a porous shell composed of silica-alumina, and the shell includes silicon and aluminum at a molar ratio of 10 to 500:1, and preferably 20 to 80:1. Since the silica-alumina shell is porous, the material may be transferred to the palladium nanoparticles, corresponding to the core, via the pores.

In the present invention, the method of directly producing hydrogen peroxide from hydrogen and oxygen is performed using, as the catalyst, the core-shell nanoparticles, especially the core-shell nanoparticles having a palladium core, and hydrogen and oxygen as reactants are placed in a reactor containing the catalyst and an alcohol solvent so as to be reacted, thereby directly producing hydrogen peroxide. Preferably, nitrogen is further placed in the reactor so as to be reacted.

More specifically, the method of directly producing hydrogen peroxide according to the present invention uses the alcohol solvent as a reaction medium, so that the process of directly producing hydrogen peroxide is carried out in a liquid phase. The alcohol solvent is selected so as to be suitable for the end use of hydrogen peroxide, and is preferably methanol, ethanol, or a mixed solution of alcohol and water. Particularly useful is a mixed solution of ethanol and water.

Also, the above reaction is carried out in a high-temperature high-pressure autoclave, and the reaction temperature of 10 to 30° C. may be maintained using a heating device around the outer wall of the reactor, and a thermometer and a cooling device, which are provided in the reactor, thus directly producing hydrogen peroxide.

The reactants, namely hydrogen and oxygen, are introduced in the form of gas into the reactor, and are preferably directly supplied to the solvent using a dip tube able to be immersed in the solvent in order to increase solubility in the solvent. The hydrogen gas and the oxygen gas are preferably allowed to flow at rates of 1 to 4 mL/min and 10 to 40 mL/min, respectively, and more preferably 1.5 to 2.5 mL/min and 15 to 25 mL/min, respectively. Due to the flow rates of the hydrogen gas and the oxygen gas, hydrogen and oxygen are introduced into the reactor while being maintained at a molar ratio of 1:5 to 15.

While the hydrogen gas and the oxygen gas are allowed to flow at the above flow rates into the reactor, the total reaction pressure is adjusted using a BPR (Back-Pressure Regulator), and the reaction pressure is measured using a pressure gauge connected to the reactor. In the method of directly producing hydrogen peroxide, the reaction pressure is maintained in the range of 1 to 40 atm, and preferably at atmospheric pressure.

In the method of directly producing hydrogen peroxide according to the present invention, a halogen compound is preferably further added to the alcohol solvent. In the case of a catalyst including palladium, when a halogen compound is added, a portion of the halogen compound is adsorbed to palladium. The active site on which the halogen compound is adsorbed is known to be more efficiently adsorbed to the active site on which the water byproduct is produced, rather than the active site on which hydrogen peroxide is produced. Accordingly, when a small amount of halogen compound is added, the selectivity of hydrogen peroxide is increased, thus increasing the productivity of hydrogen peroxide.

The halogen compound may include compounds including at least one selected from the group consisting of bromine (Br), chlorine (Cl) and iodine (I) ions, or mixtures of the compounds. Preferably useful is a compound including bromine (Br) ions.

When the halogen compound is further added, it is used in a concentration of 0.1 M or less but exceeding zero, and preferably 5 mM or less but exceeding zero.

In the method of directly producing hydrogen peroxide according to the present invention, an acid is preferably further added to the alcohol solvent.

The acid may include at least one selected from the group consisting of sulfuric acid ($H_2SO_4$), hydrochloric acid (HCl), phosphoric acid ($H_3PO_4$) and nitric acid ($HNO_3$). Preferably useful is phosphoric acid ($H_3PO_4$).

When the acid is further added, it is used in a concentration of 1 M but exceeding zero, and preferably 0.03 M or less but exceeding zero.

When the acid is contained in this way, the decomposition of the synthesized hydrogen peroxide may be inhibited, and the selectivity of hydrogen peroxide may be increased, but the use of the acid may cause the dissolution of the active metal of the catalyst or the corrosion of the reactor.

However, the core-shell nanoparticles, which are used in the method of directly producing hydrogen peroxide according to the present invention, have acid sites, and may function as an acid, whereby the amount of the acid that is required to be used in the method of directly producing hydrogen peroxide may be decreased, and the amount of hydrogen peroxide that is produced may be increased.

A better understanding of the present invention may be obtained via the following examples, which are set forth to illustrate, but are not to be construed as limiting the scope of the present invention. The scope of the present invention is given by the claims, and also contains all modifications within the meaning and range equivalent to the claims.

MODE FOR INVENTION

<Preparation of Core-Shell Nanoparticles>

Example 1

0.068 mmol of ascorbic acid, 0.189 mmol of PVP, and 5 mmol of potassium bromide (KBr) were dissolved in tertiary ultrapure water, thus preparing 16 mL of a solution, which was then stirred at 80° C. for 10 min using a magnetic bar. 6 mL of a disodium tetrachloropalladate ($Na_2PdCl_4$) solution (64 mM) was added, and the resulting mixture was reacted with stirring at the same temperature for 3 hr using a magnetic bar.

After the reaction, the reaction solution and acetone were mixed at a ratio of 1:10, and the produced nanoparticles were recovered using a centrifuge (3500 rpm, 10 min), followed by several washing processes using tertiary ultrapure water, thus manufacturing cubic palladium particles.

The palladium nanoparticles thus manufactured were dispersed again in 200 mL of ethanol, and added with 18 mL of water and 24 mL of ammonia water. The resulting mixture was stirred for 3 hr, and a shell was synthesized using a silica precursor TEOS and an alumina precursor di-sec-butoxyaluminoxy-triethoxysilane so that a Si/Al molar ratio was 20:1.

After stirring for 24 hr using a magnetic bar, the produced nanoparticles were recovered using a centrifuge. The recovered nanoparticles were washed several times using tertiary ultrapure water and then thermally treated at 500° C. for 6 hr, thereby obtaining a palladium@silica-alumina core-shell, namely Pd@SA(20) (FIG. 1).

Example 2

Figure 2:
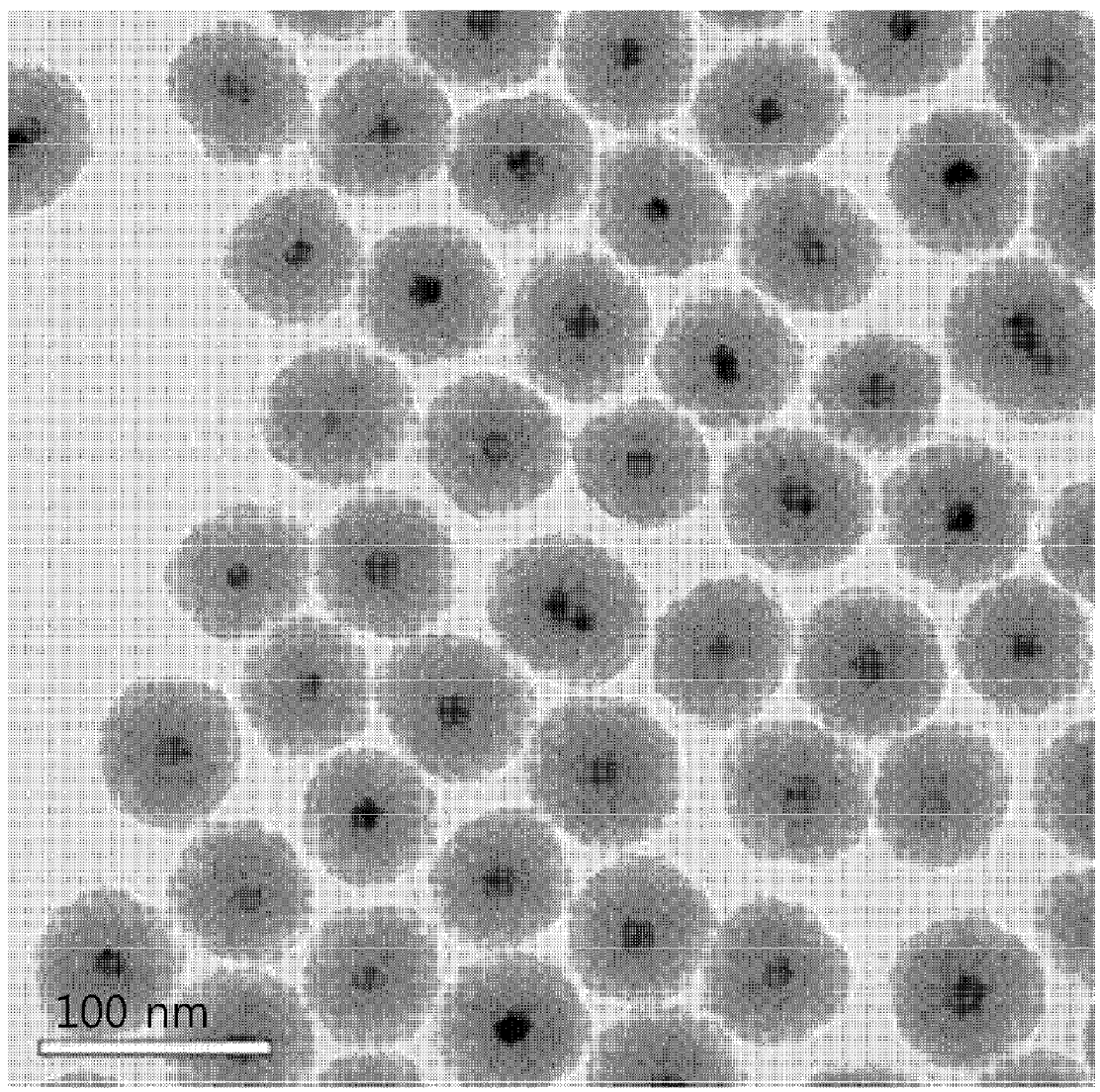
FIG. 2 is a TEM image showing core-shell nanoparticles (Pd@SA(50)) of Example 2.

A palladium@silica-alumina core-shell, namely Pd@SA (50) (FIG. 2), was manufactured in the same manner as in Example 1, with the exception that the Si/Al molar ratio was 50:1.

Example 3

Figure 3:
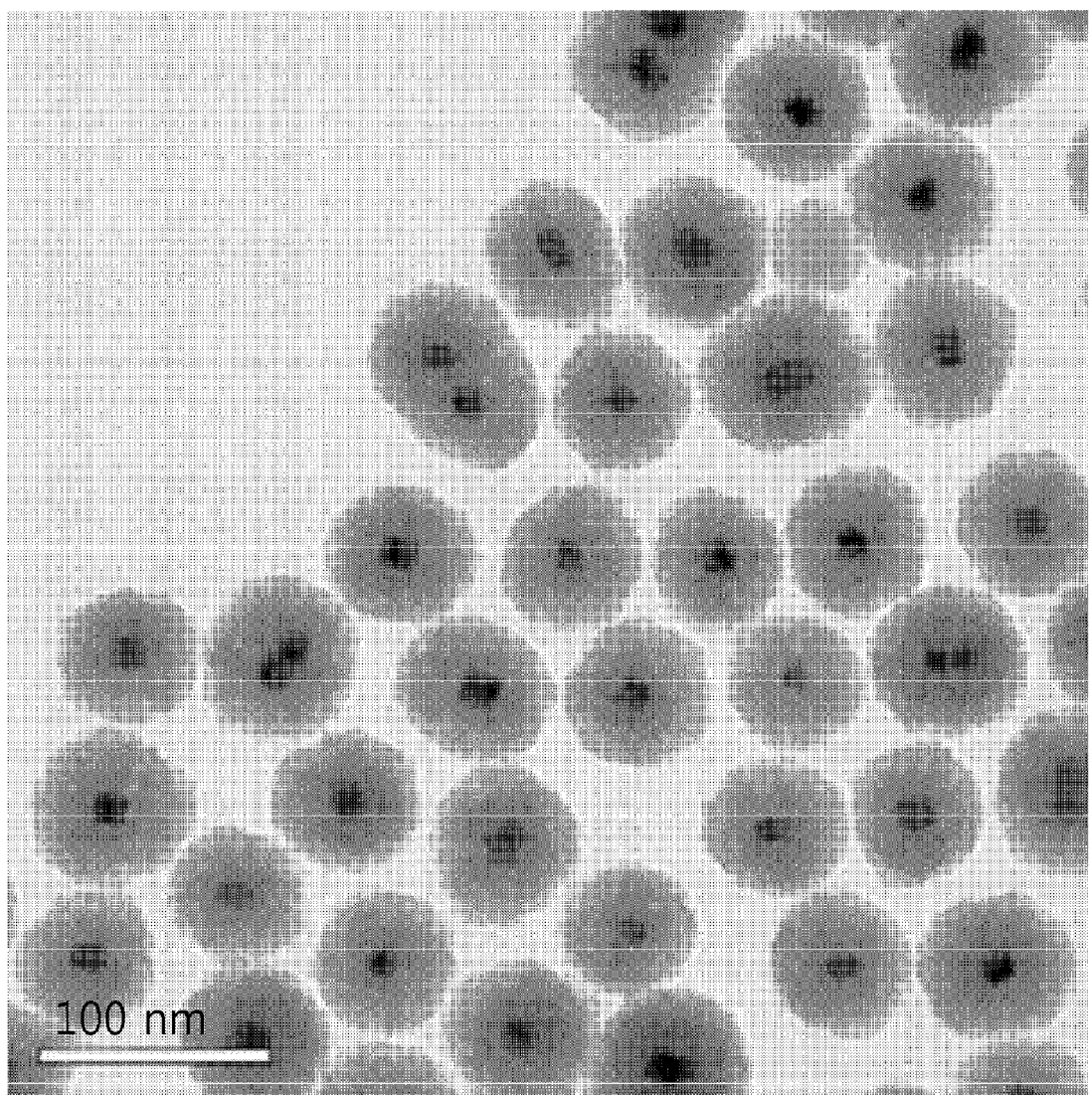
FIG. 3 is a TEM image showing core-shell nanoparticles (Pd@SA(100)) of Example 3.

A palladium@silica-alumina core-shell, namely Pd@SA (100) (FIG. 3), was manufactured in the same manner as in Example 1, with the exception that the Si/Al molar ratio was 100:1.

Comparative Example 1

Figure 4:
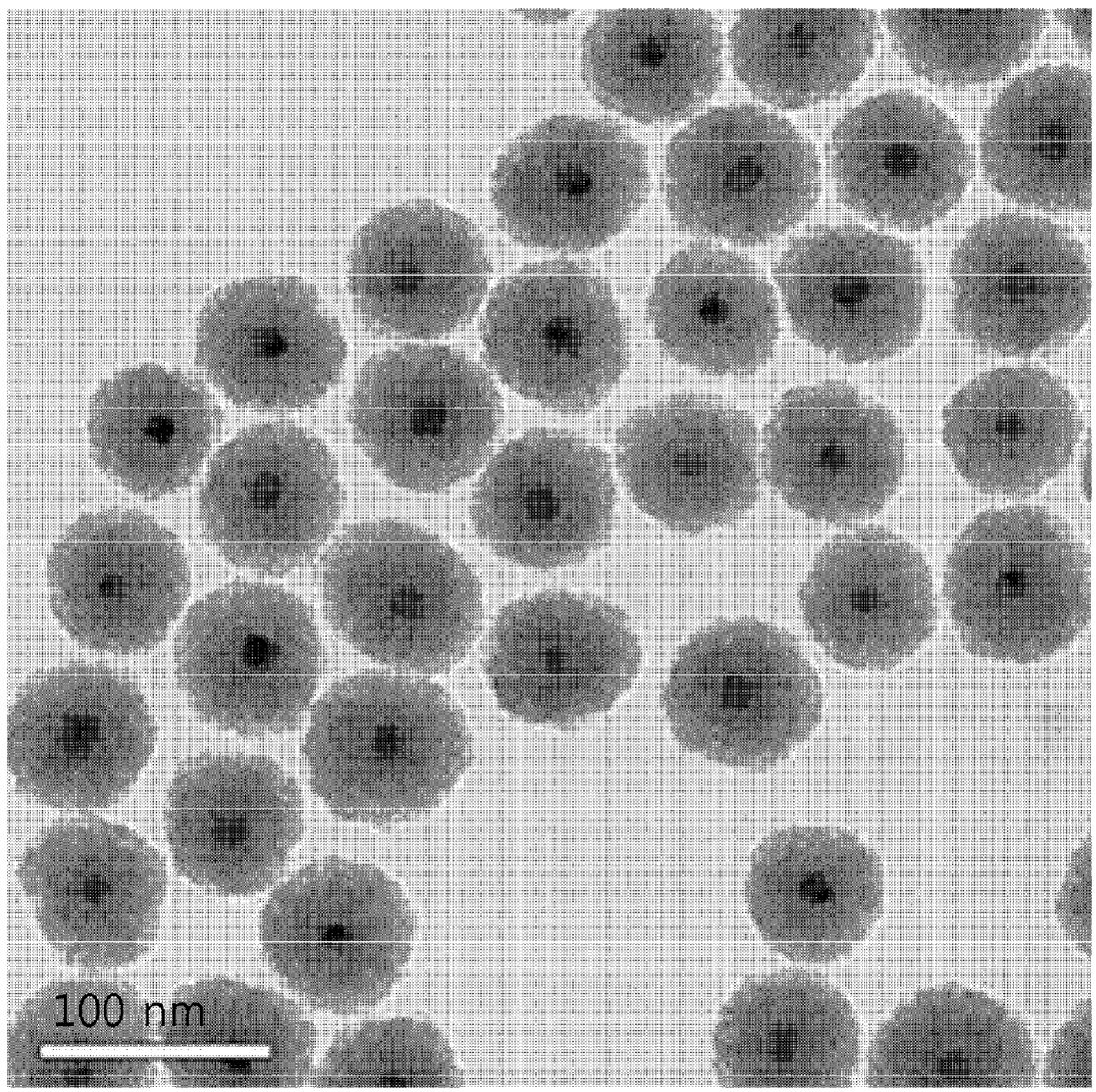
FIG. 4 is a TEM image showing core-shell nanoparticles (Pd@S) of Comparative Example 1.

Pd@S (FIG. 4) was manufactured in the same manner as in Example 1, with the exception that the alumina precursor was not used and only the silica precursor was used.

Test Example 1

Analysis of Core-Shell Nanoparticles (Pd@SA(20)) of Example 1

Figure 5:
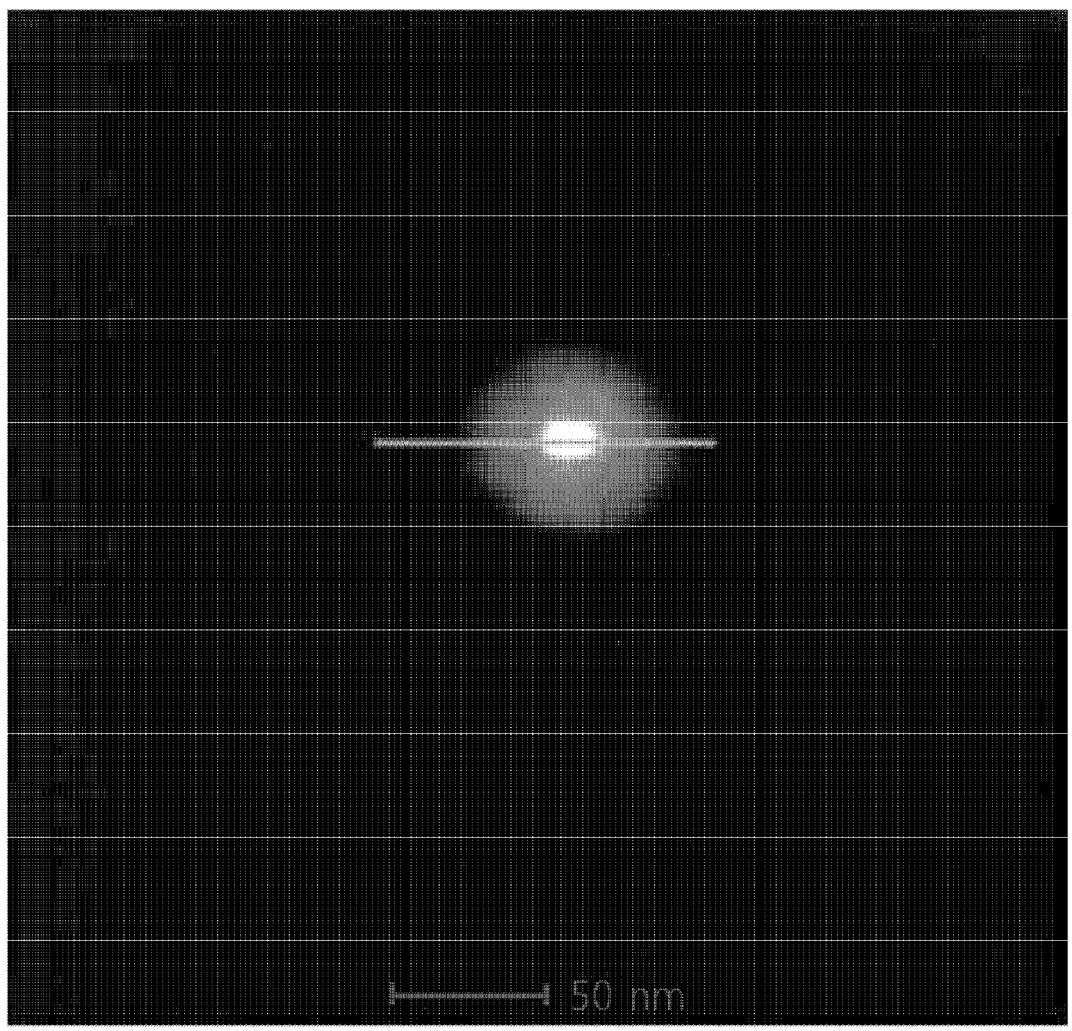
FIG. 5 is a STEM image showing the core-shell nanoparticle (Pd@SA(20)) of Example 1.

The Pd@SA(20) nanoparticles of Example 1 were observed using STEM, and the core-shell structure thereof was confirmed (FIG. 5).

Figure 6:
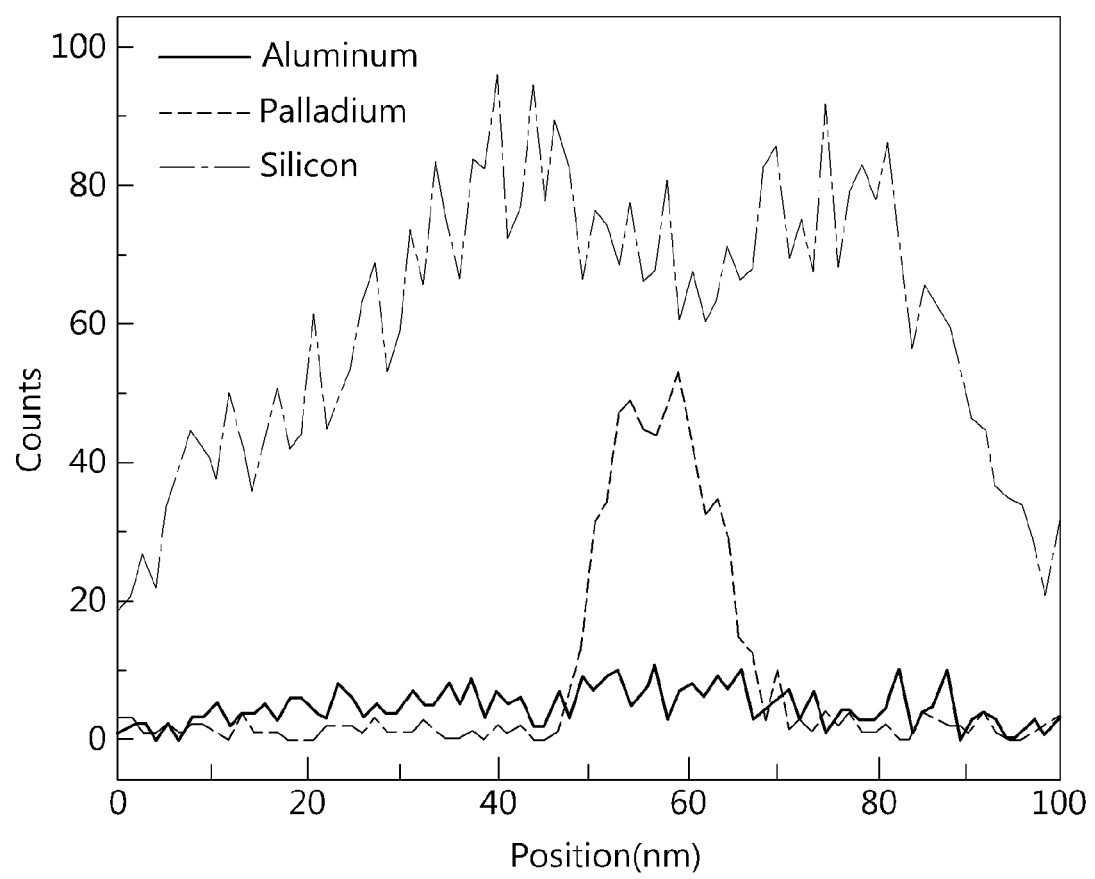
FIG. 6 is a graph showing the results of EDX of the core-shell nanoparticles (Pd@SA(20)) of Example 1.

Elemental analysis was performed using EDX along the orange line of FIG. 5. Based on the results of measurement of the amounts of aluminum (Al), silicon (Si) and palladium (Pd), detected through EDX analysis (FIG. 6), the shell contained silicon and aluminum atoms.

Test Example 2

Spectroscopy of Core-Shell Nanoparticles

The physical properties of the core-shell nanoparticles of Examples 1 to 3 and Comparative Example 1 were measured using an inductively coupled plasma-optical emission spectrometer (ICP-OES). The results are shown in Table 1 below.

TABLE 1

| No. | Pd wt %<br>(ICP-OES) | Si/Al ratio<br>(ICP-OES) |
| --- | --- | --- |
| Example 1 (Pd @ SA(20)) | 2.98 | 19.9 |
| Example 2 (Pd @ SA(50)) | 3.06 | 53.9 |
| Example 3 (Pd @ SA(100)) | 2.94 | 99.7 |
| Comp. Example 1 (Pd @ S) | 2.89 | — |

As is apparent from the results of Table 1, the Si/Al molar ratio of the shell was observed to have almost the same amounts of the silica precursor and the alumina precursor. Furthermore, Comparative Example 1 did not use the alumina precursor, and thus a Si/Al molar ratio was not observed.

Test Example 3

Test of Nitrogen Adsorption-Desorption of Core-Shell Nanoparticles

The test of nitrogen adsorption-desorption of the core-shell nanoparticles of Examples 1 to 3 and Comparative Example 1 was performed.

The test of nitrogen adsorption-desorption was carried out using BELSORP-MAX (BEL Japan Inc.).

Each of the core-shell nanoparticles (Pd@SA(20), Pd@SA(50), Pd@SA(100), and Pd@S) of Examples 1 to 3 and Comparative Example 1 was placed in a glass cell made of quartz. Also, the organic material and water were removed from the surfaces thereof in a vacuum at 200° C. Thereafter, the cell was evacuated and then placed in liquid nitrogen at a temperature of 77 K. Thereafter, a predetermined amount of nitrogen was added and nitrogen was adsorbed on the surface of the core-shell nanoparticles (Pd@SA(20), Pd@SA(50), Pd@SA(100) and Pd@S) of Examples 1 to 3 and Comparative Example 1. While nitrogen was continuously slowly introduced, the amount of nitrogen adsorbed on the sample was calculated through changes in the pressure of the cell.

From the results of the test of nitrogen adsorption-desorption, the specific surface area was calculated through BET analysis. The results are shown in Table 2 below.

TABLE 2

| No. | Specific surface area (m²/g) |
| --- | --- |
| Example 1 (Pd @ SA(20)) | 305.8 |
| Example 2 (Pd @ SA(50)) | 338.7 |
| Example 3 (Pd @ SA(100)) | 339.5 |
| Comp. Example 1 (Pd @ S) | 335.1 |

As is apparent from the results of Table 2, even when the shells of Examples 1 to 3 included silica and alumina, they had a large specific surface area. Since the position at which acid sites are expressed is the surface, the amount of acid sites is proportional to the specific surface area. Thus, the surface of the core-shell nanoparticles according to the present invention can be found to have a specific surface area on which the acid sites are sufficiently expressed.

Figure 7:
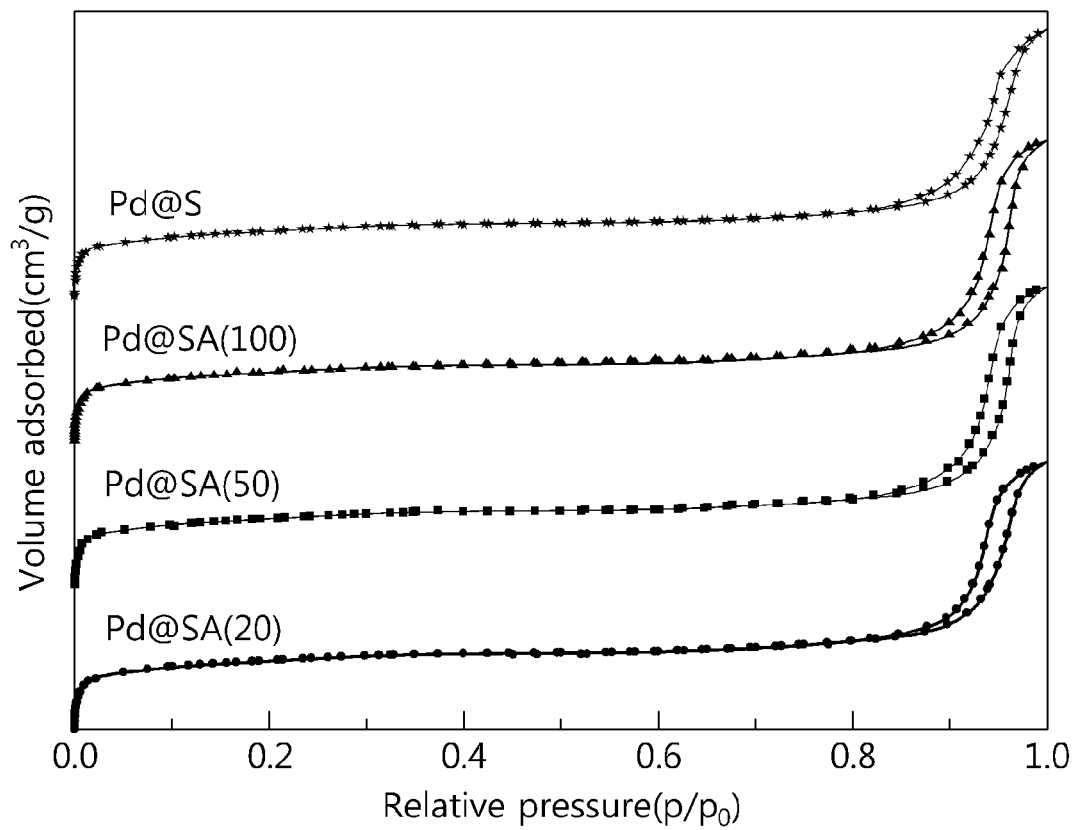
FIG. 7 is a graph showing the nitrogen adsorption-desorption measurement of the core-shell nanoparticles of Examples 1 to 3 and Comparative Example 1.

Also, the nitrogen adsorption-desorption curve is shown in the form of a hysteresis shape, from which it can be confirmed to be a porous material (FIG. 7). This means that the pores are formed in the shell of the present invention so that the material is transferred to the palladium (Pd) core in the core-shell nanoparticles.

Thus, even when the shells of the core-shell nanoparticles of Examples 1 to 3 include silica and alumina, they have a large specific surface area. Furthermore, the shell has pores.

Test Example 4

Test of Ammonia Desorption of Core-Shell Nanoparticles 0.03 g of the core-shell nanoparticles of Example 1 (Pd@SA(20)) and Comparative Example 1 (Pd@S) was pretreated at 400° C. for 2 hr in a helium atmosphere (50 mL/min). Thereafter, ammonia was adsorbed for 30 min at 50 in an ammonia atmosphere (50 mL/min). To remove physically adsorbed ammonia, helium was allowed to flow at 150 for 2 hr. Then, the temperature was elevated from 50 to 500 at a rate of 5/min, and the amount of desorbed ammonia was measured.

As results thereof, the desorption of ammonia was observed in the core-shell nanoparticles (Pd@SA(20)) of Example 1, and was not observed in the core-shell nanoparticles (Pd@S) of Comparative Example 1.

Figure 8:
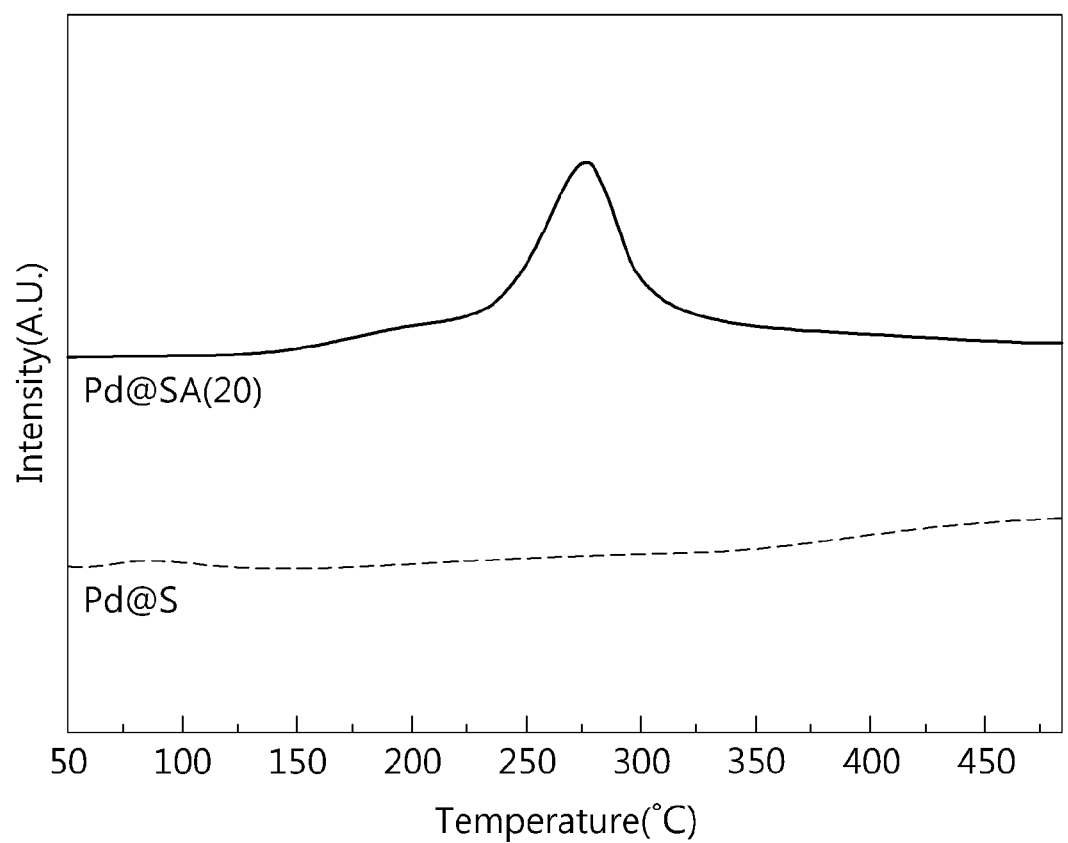
FIG. 8 is a graph showing the amount of desorbed ammonia of the core-shell nanoparticles of Example 1 and Comparative Example 1.

Therefore, the core-shell nanoparticles (Pd@SA(20)) of Example 1 had acid sites, and the core-shell nanoparticles (Pd@S) of Comparative Example 1 had no acid sites (FIG. 8).

Test Example 5

Test of Pyridine Adsorption of Core-Shell Nanoparticles 0.06 g of the core-shell nanoparticles of Example 1 (Pd@SA(20)) and Comparative Example 1 (Pd@S) was pressurized to form respective thin films, which were then placed in an IR-Cell. Pretreatment at 300° C. for 2 hr in a vacuum and then cooling to 150° C. were conducted.

Thereafter, pyridine was vaporized, adsorbed for 30 min to respective samples, and analyzed at 150° C. A vacuum was applied until the physical adsorption of pyridine disappeared, and 100 analytical values were averaged.

Figure 9:
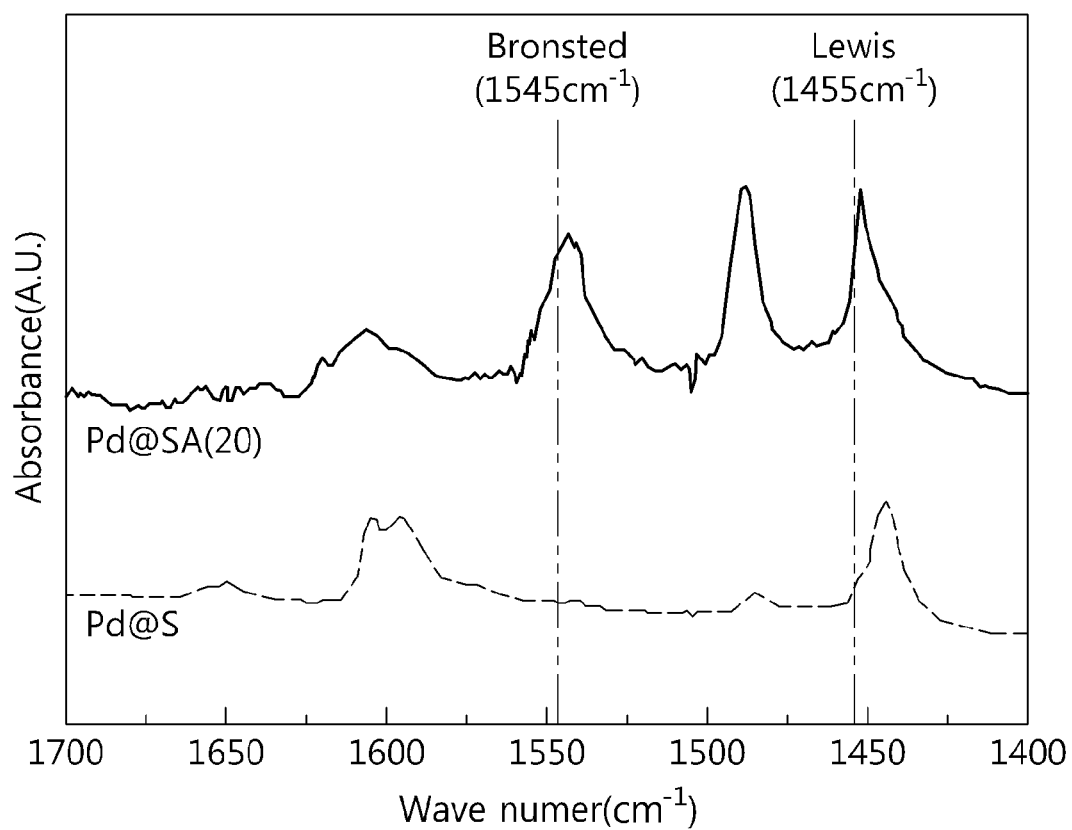
FIG. 9 is a graph showing the FT-IR of the core-shell nanoparticles of Example 1 and Comparative Example 1, to which pyridine is adsorbed.

As results thereof, the core-shell nanoparticles (Pd@SA (20)) of Example 1 had both Bronsted acid sites and Lewis acid sites, and the core-shell nanoparticles (Pd@S) of Comparative Example 1 had no acid sites (FIG. 9).

Test Example 6

Measurement of Amount of Produced Hydrogen Peroxide Depending on the Concentration of Phosphoric Acid 6-1. Core-Shell Nanoparticles (Pd@SA(20)) of Example 1

A reaction solvent (120 mL of ultrapure water, 30 mL of ethanol, and 0.9 mM KBr) was added into a double-jacket reactor. 50 mg of the core-shell nanoparticles (Pd@SA(20)) of Example 1 were placed in the double-jacket reactor, and the reaction was carried out for 3 hr.

The reaction temperature and pressure were maintained at 20° C. and 1 atm, respectively, and the reactive gas ($H_2$/$O_2$=1/10) was allowed to flow at a predetermined rate of 22 mL/min. After the reaction, the amount of hydrogen peroxide that was produced was measured.

Also, the amount of produced hydrogen peroxide was measured depending on the concentration (0.01, 0.02 and 0.03 M) of phosphoric acid in the same manner as above, with the exception that phosphoric acid was added in a concentration of 0.01 M, 0.02 M and 0.03 M to the reaction solvent.

6-2. Core-Shell Nanoparticles (Pd@S) of Comparative Example 1

This measurement was performed in the same manner as above, with the exception that the core-shell nanoparticles (Pd@S) of Comparative Example 1 were used, in lieu of the core-shell nanoparticles (Pd@SA(20)) of Example 1.

Also, the amount of produced hydrogen peroxide was measured depending on the concentration (0.01, 0.02 and 0.03 M) of phosphoric acid in the same manner as above, with the exception that phosphoric acid was added in a concentration of 0.01 M, 0.02 M and 0.03 M to the reaction solvent.

After the reaction, the produced hydrogen peroxide was recovered, and the concentration of hydrogen peroxide was measured through an iodine titration process using Equation 1 below, and the amount of hydrogen peroxide that was produced was calculated using Equation 2 below.

$$H_2O_2 \ (wt \ \%) = \frac{17.007 \times 0.01 \times Na_2SO_3 \ (\mu L)}{\text{weight of Product (g)} \times 1000} \times 100 \quad \text{[Equation 1]}$$

$$\text{Productivity} = \frac{H_2O_2 \ \text{synthesized}}{\text{weight of Pd} \times \text{reaction time}} \quad \text{[Equation 2]}$$

Figure 10:
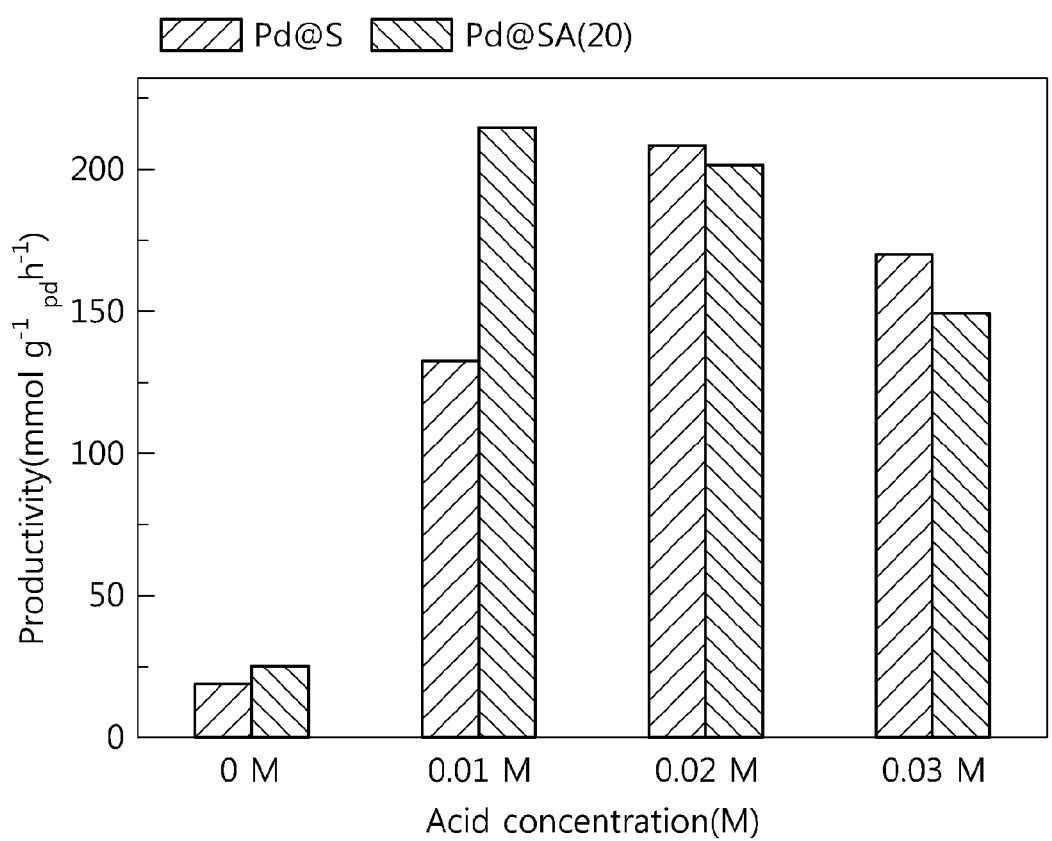
FIG. 10 is a graph showing the amount of produced hydrogen peroxide depending on the amount of phosphoric acid in the core-shell nanoparticles of Example 1 and Comparative Example 1.

As results thereof, the concentration of phosphoric acid able to maximally produce hydrogen peroxide was determined to be 0.02 M in the core-shell nanoparticle (Pd@S) catalyst of Comparative Example 1, but was observed to be 0.01 M in the core-shell nanoparticle (Pd@SA(20)) catalyst of Example 1. Furthermore, when the concentration of phosphoric acid in the core-shell nanoparticles (Pd@SA(20)) of Example 1 was decreased, the amount of produced hydrogen peroxide was increased (FIG. 10).

Consequently, hydrogen peroxide can be directly produced using core-shell nanoparticles as the catalyst, and the core-shell nanoparticles of the present invention, useful as the catalyst, have acid sites, and thus, even when the concentration of the acid is decreased, the amount of hydrogen peroxide that is produced is not reduced, as confirmed through experiments.

The invention claimed is:

1. A method of manufacturing a core-shell nanoparticle, comprising steps of:
   (1) preparing a palladium nanoparticle have a particle size of 5-30 nm;
   (2) dispersing the prepared palladium nanoparticle in a dispersion solvent, adding a base solution, and performing stirring;
   (3) adding the solution stirred in the step (2) with a silica precursor and an alumina precursor, thus forming a shell consisting of silica-alumina composite on a surface of the palladium nanoparticle; and
   (4) thermally treating the palladium nanoparticle having the shell consisting of silica-alumina composite formed on the surface thereof,
   wherein the core-shell nanoparticle comprises:
   a shell consisting of the a silica-alumina composite having both a Lewis acid site and a Bronsted acid site; and
   a core including a palladium nanoparticle surrounded by the shell,
   wherein the base solution is used in an amount of 5 to 10 vol % based on a total volume of the dispersion solvent,
   wherein the alumina precursor is di-sec-butoxyaluminoxy-triethoxysilane,
   the silica precursor and the alumina precursor mixed so that the silicon:aluminum molar ratio is 20 to 80.

2. The method of claim 1, wherein the dispersion solvent includes at least one selected from the group consisting of an organic solvent and water, and
   the organic solvent includes at least one selected from the group consisting of methanol, ethanol, n-propanol, isopropanol, hexane, toluene, and benzene.

3. The method of claim 1, wherein the silica precursor includes at least one selected from the group consisting of tetramethyl orthosilicate, tetraethyl orthosilicate, tetrapropyl orthosilicate, and tetrabutyl orthosilicate.

4. The method of claim 1, wherein the thermally treating in the step (4) is performed at a temperature of 400 to 900° C. for 3 to 18 hr.

* * * * *